United States Patent
Mueller

(10) Patent No.: US 7,329,037 B2
(45) Date of Patent: Feb. 12, 2008

(54) PLASTICATING SCREW FOR AN EXTRUDER OR EXTRUSION PRESS, HAVING A NARROWER LAND WIDTH IN THE TRANSITION REGION

(75) Inventor: Friedrich Mueller, Kressbronn (DE)

(73) Assignee: Lindauer DORNIER Gesellschaft mbH, Lindau (DE)

( * ) Notice: Subject to any disclaimer, the term of this patent is extended or adjusted under 35 U.S.C. 154(b) by 527 days.

(21) Appl. No.: 10/528,912

(22) PCT Filed: Aug. 28, 2003

(86) PCT No.: PCT/DE03/02860

§ 371 (c)(1),
(2), (4) Date: Mar. 23, 2005

(87) PCT Pub. No.: WO2004/030893

PCT Pub. Date: Apr. 15, 2004

(65) Prior Publication Data

US 2006/0023565 A1 Feb. 2, 2006

(30) Foreign Application Priority Data

Sep. 27, 2002 (DE) .............................. 102 45 278

(51) Int. Cl.
*B29B 7/42* (2006.01)
(52) U.S. Cl. .......................... 366/88; 366/89
(58) Field of Classification Search .................. 366/88, 366/89
See application file for complete search history.

(56) References Cited

U.S. PATENT DOCUMENTS

| | | | |
|---|---|---|---|
| 3,271,819 A * | 9/1966 | Lacher | 366/89 |
| 3,273,201 A | 9/1966 | Reifenhauser | |
| 3,368,724 A * | 2/1968 | Reifenhauser et al. | 366/88 |
| 3,650,652 A * | 3/1972 | Dray et al. | 425/206 |
| 3,867,079 A * | 2/1975 | Kim | 366/88 |
| 3,946,998 A | 3/1976 | Menges et al. | |
| 4,000,884 A * | 1/1977 | Chung | 366/88 |
| 4,201,481 A * | 5/1980 | Iddon et al. | 366/79 |
| 4,341,474 A * | 7/1982 | Wheeler et al. | 366/88 |
| 4,729,662 A * | 3/1988 | O'Brien | 366/89 |
| 4,733,970 A * | 3/1988 | Yokana | 366/79 |
| 4,798,472 A * | 1/1989 | Chan et al. | 366/89 |
| 5,141,326 A * | 8/1992 | Eshima | 366/88 |
| 5,599,097 A * | 2/1997 | Christie | 366/88 |
| 5,599,098 A | 2/1997 | Christie | |
| 5,698,235 A | 12/1997 | Satoh et al. | |
| 7,156,550 B2 * | 1/2007 | Womer et al. | 366/88 |

FOREIGN PATENT DOCUMENTS

| | | |
|---|---|---|
| DE | 196 34 162 | 2/1997 |
| WO | WO 00/34027 | 6/2000 |

* cited by examiner

*Primary Examiner*—Tony G Soohoo
(74) *Attorney, Agent, or Firm*—W. F. Fasse; W. G. Fasse

(57) ABSTRACT

A plasticating screw for an extruder or an extrusion press has a thread change, whereby the volume of the transporting cross-section does not change and thus a pressure increase in the region of the thread is avoided. To this end, in the region wherein a first and a second screw thread of the plasticating screw overlap, the thread width outside the overlapping region is equal to d and the thread width inside the overlapping region is equal to ½ d.

7 Claims, 2 Drawing Sheets

SECTION A-A

DETAIL X

PLASTICATING SCREW FOR AN EXTRUDER OR EXTRUSION PRESS, HAVING A NARROWER LAND WIDTH IN THE TRANSITION REGION

FIELD OF THE INVENTION

The invention relates to a plasticating screw for an extruder or an extrusion press having a high polymer melt through-put.

BACKGROUND OF THE INVENTION

The invention relates in particular to the metering zone of such a plasticating screw. In plasticating screws, such a metering zone follows directly on the plasticating zone. This section of the screw, also known as the compression zone, thoroughly mixes the heat-softened granular material and conveys the plasticated material onwards under pressure towards an extruder nozzle. Intermixing in this zone constitutes an important task of an extruder screw, since the plasticated material is still inhomogeneous, that is, as yet unplasticated constituents could be present, which still have to be heat-softened. The inhomogeneity causes different shear forces at the walls of the screw and in the middle of the screw channel, whereby intimate mixing of the material is prevented and additionally pressure fluctuations in the material can arise. To remedy these problems, screws having a tapering screw channel and screws having guide webs in the main spiral have been proposed, for example, as well as plasticating screws having one or more of these above-mentioned features combined.

For example, such plasticating screws inter alia are already described in WO 00/34027, DE 196 34 162 C2 and U.S. Pat. No. 5,599,098. WO 00/34027 describes the principle of increasing the channel depth in conjunction with guide members. In German patent 196 34 162 C2, an auxiliary screw is provided before the end of the plasticating screw in order to keep variations in edge thickness in strip-form material to a minimum. U.S. Pat. No. 5,599,098 describes an extruder screw having a melt section for plastics material, the section consisting of screw channels that partially overlap. In this case, the flow of material at the start of the overlapping screw channels is divided into two partial melts, the flow rate and hence the pressure of the material increasing because of the smaller overall cross-section. The newly starting screw channel is continued, whilst the original screw channel ends after ½-1 turn in the direction of flow. The drawback to this solution is that the available cross-section of the overlapping screw channels, especially at high material through-put, is reduced at least by one screw wall cross-section. At the same time, this is associated with a sudden increase in pressure.

SUMMARY OF THE INVENTION

It is an object of the present invention to construct for an extruder or for an extrusion press a plasticating screw for a high material through-put, in such a way that a change in volume of the conveying cross-section and hence a sudden increase in pressure in the polymer melt is prevented in the region of the flight change or changes. Suitable measures shall be provided for a slow build-up of any necessary pressure.

That object is achieved in accordance with the invention in that the cross-sections of the screw flights in the overlapping region are reduced in such a way that the combined conveying cross-section of the screw channels in the region of the overlapping screw flights corresponds to the conveying cross-section of the screw channel immediately before overlap of the screw flights. In particular the actual cross-sectional transition from single-flighted to twin-flighted conveying cross-section is configured so that there is no change in cross-section in this transition region either.

In order to achieve a slow pressure build-up in the compression zone, the invention provides for the at least one flight change in this zone to be constructed in accordance with the invention and, for pressure increase, for the shaft diameter of the screw to increase gradually in this zone the screw shaft diameter may vary conically in the region of overlap of the screw flights. A sudden pressure build-up in the polymer melt at the start of the flight change is thereby avoided, and both a uniform flow of the polymer melt is achieved and the desired blending of the melt as a result of the flight change takes place. Changes of flight arranged according to the invention further downstream in the direction of flow can serve for further intensive intermixing of the polymer melt. For a desired pressure relief upstream of the extruder nozzle, provision is furthermore made for the radius of the screw shaft to diminish over 360 degrees about an axis of the screw shaft in a region between two flight changes while an outer surface of the screw shaft remains parallel to the axis in this region.

BRIEF DESCRIPTION OF THE DRAWINGS

The invention is explained in detail below with reference to an exemplary embodiment. In the accompanying drawings.

DETAILED DESCRIPTION OF AN EXAMPLE EMBODIMENT OF THE INVENTION

Figure 1:
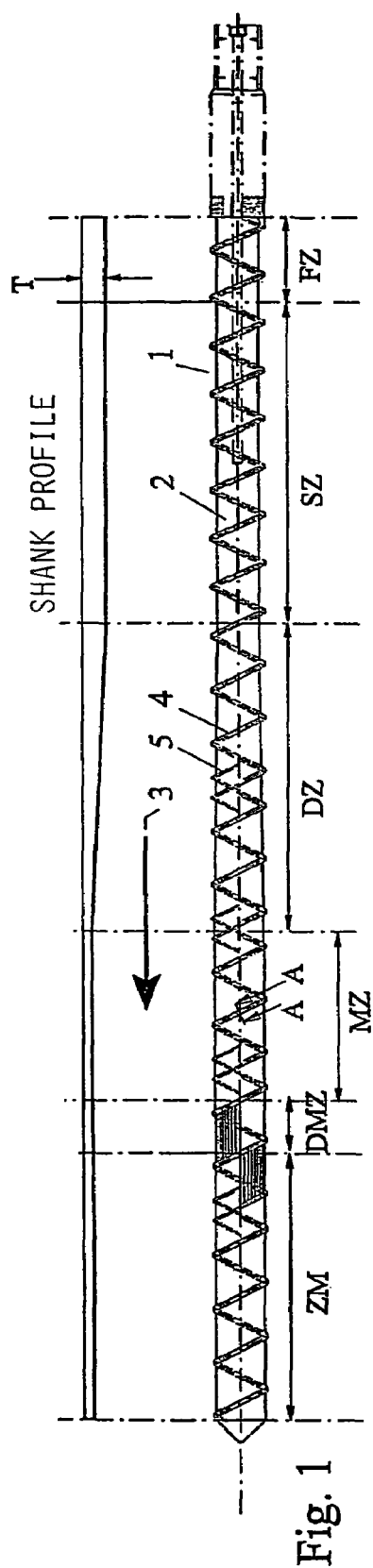
FIG. 1 shows a plasticating screw according to the invention with several overlaps of a first and second screw flight, and the associated developed view.

FIG. 1 shows the plasticating screw 1 according to the invention for plasticating a plasticatable polymer material, having several overlaps of a first and second screw channel 4, 5 in the direction of flow 3 of the material from right to left, at least one flight change occurring in the region of the compression zone DZ; further flight changes can be provided upstream and downstream of a pressure-reduction zone DMZ. A polymer is fed on the righthand side to the plasticating screw in a filling zone FZ of the plasticating screw 1 and is largely plasticated in the adjoining melt zone SZ. In the compression zone DZ adjoining to the left, a gradual enlargement of the screw shaft diameter, e.g. conically, reduces the channel depth T of the screw channel 2 and hence increases the pressure of the melt. The effect of the flight change according to the invention provided in this region is that the melt is thoroughly mixed in order to heat-soften any as yet not heat-softened polymer constituents, with no sudden pressure increase at the start of this flight change or in the further course thereof. Further flight changes according to the invention are arranged in a mixing zone MZ, in order to achieve even more intensive mixing of the melt. In a pressure-reduction zone DMZ, provision of which is optional, the channel depth is increased around the screw shaft, for example, while the surface of the screw shaft remains axially parallel, and hence pressure relief is achieved before the melt is fed via a metering zone ZM to the nozzle.

Figure 2:
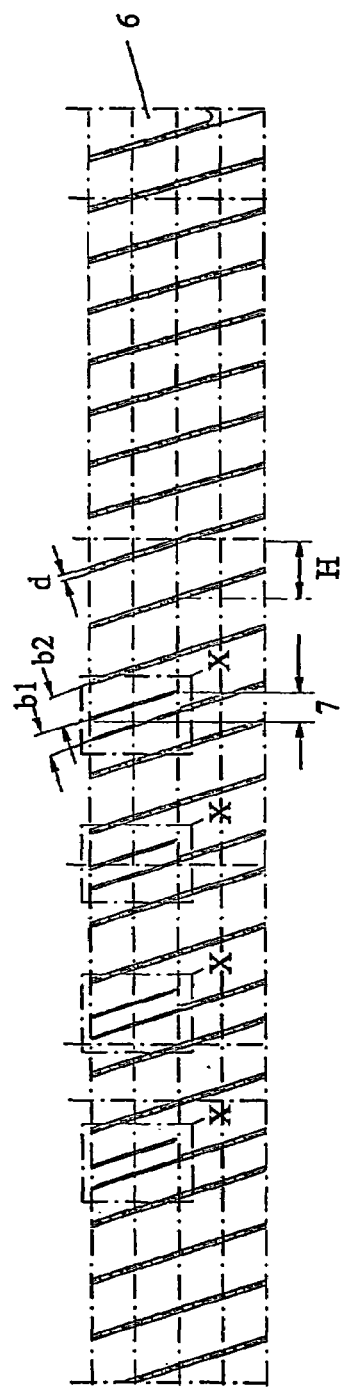
FIG. 2 shows a developed view as per FIG. 1.

FIG. 2 shows the associated developed view 6. The ratio of channel widths b1, b2 in the overlapping region 7 is about 1:2.

Figure 3:
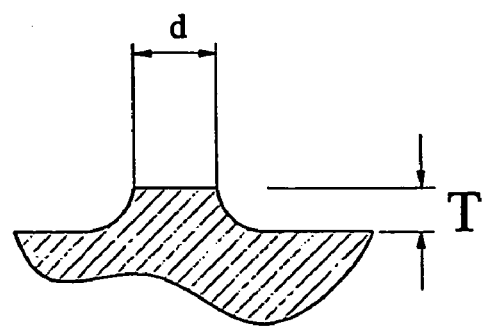
FIG. 3 shows the cross-section of a screw flight of a plasticating screw according to the invention.

FIG. 3 shows the cross-section of a flight 4 of a plasticating screw 1 according to the invention.

Figure 4:
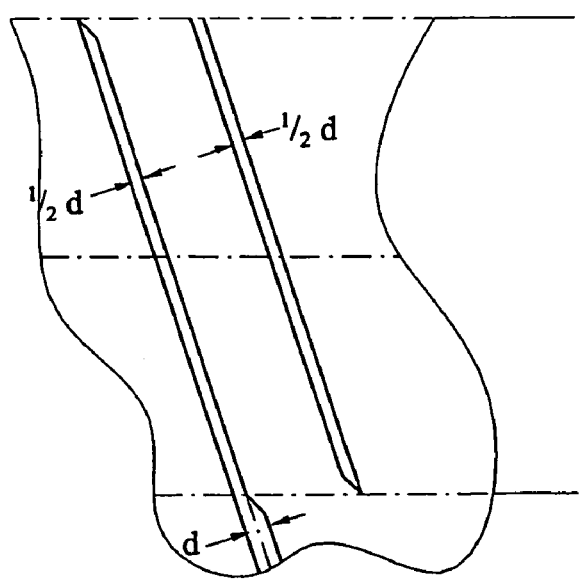
FIG. 4 shows the start of an overlap zone.

FIG. 4 shows as detail X, in plan view, the start of a flight overlap with a cross-sectional change in the flights 4, 5, the flight width outside the overlap being d and the flight widths within the overlap being ½ d.

The invention claimed is:

1. A plasticating screw for an extruder or extrusion press having a high polymer melt through-put, wherein the plasticating screw comprises a screw shaft received and rotatably driven in a cylindrical barrel in order to transport the admitted plasticatable polymer to an extruder nozzle located at the other end, the polymer undergoing plastication and being transported and mixed by a screw channel formed by a first flight running helically along the screw shaft, and wherein in at least one region of the longitudinal extent of the plasticating screw at least a second flight running helically along the screw shaft overlaps the first flight, characterized in that the cross-sections of the at least two flights (4, 5) in the overlapping region are reduced to such an extent that their overall cross-section corresponds to the cross-section of the first flight (4) immediately before the overlapping region (7).

2. A plasticating screw according to claim 1, characterized in that in the region of the overlap the width of the screw channel (2) is divided by the second flight (5).

3. A plasticating screw according to claim 1, characterized in that after the start of the second flight (5) the screw channel (2) continues in the direction of flow of the material as a double screw channel.

4. A plasticating screw according to claim 1, characterized in that the overlapping region of the at least two screw channels extends over at least half of a screw revolution.

5. A plasticating screw according to claim 1, characterized in that the channel width (H) of the screw channel (2) in the overlapping region is divided by the second flight (5) approximately in a ratio of 1:2.

6. A plasticating screw according to claim 1, characterized in that the screw shaft diameter varies conically in the region of the at least one overlap of the screw flights.

7. A plasticating screw according to claim 1, characterized in that the radius of the screw shaft between at least two further overlapping flights diminishes over 360 degrees about an axis of the screw shaft while an outer surface of the screw shaft between the further overlapping flights remains parallel to the axis of the screw shaft, so as to increase the channel depth between the further overlapping flights over the 360 degrees.

* * * * *